US012663074B2

(12) United States Patent
Yamamoto et al.

(10) Patent No.: US 12,663,074 B2
(45) Date of Patent: Jun. 23, 2026

(54) SHIFT DEVICE

(71) Applicant: KABUSHIKI KAISHA TOKAI-RIKA-DENKI-SEISAKUSHO, Niwa-gun (JP)

(72) Inventors: Makoto Yamamoto, Niwa-gun (JP); Yutaka Inamura, Niwa-gun (JP); Takuya Watanabe, Niwa-gun (JP); Koji Kobayashi, Niwa-gun (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 0 days.

(21) Appl. No.: 18/857,753

(22) PCT Filed: Mar. 28, 2023

(86) PCT No.: PCT/JP2023/012531
§ 371 (c)(1),
(2) Date: Oct. 17, 2024

(87) PCT Pub. No.: WO2023/203977
PCT Pub. Date: Oct. 26, 2023

(65) Prior Publication Data
US 2025/0277524 A1     Sep. 4, 2025

(30) Foreign Application Priority Data

Apr. 21, 2022     (JP) ................................. 2022-070383

(51) Int. Cl.
*F16H 59/12*          (2006.01)

(52) U.S. Cl.
CPC ..................................... *F16H 59/12* (2013.01)

(58) Field of Classification Search
CPC ..... F16H 59/12; F16H 59/0217; F16H 59/044
See application file for complete search history.

(56) References Cited

U.S. PATENT DOCUMENTS

| | | | | |
|---|---|---|---|---|
| 7,424,386 | B2 * | 9/2008 | Tsubota | H03K 17/975 |
| | | | | 702/150 |
| 9,219,472 | B2 * | 12/2015 | Buttolo | H03K 5/153 |
| 9,223,403 | B2 * | 12/2015 | Araki | G06F 3/04883 |

(Continued)

FOREIGN PATENT DOCUMENTS

| | | | | |
|---|---|---|---|---|
| DE | 102018219555 A1 * | 5/2020 | | F16H 1/18 |
| DE | 10-2019-210585 A1 | 1/2021 | | |

(Continued)

OTHER PUBLICATIONS

International Search Report issued in PCT/JP2023/012531 mailed on Jun. 20, 2023.

(Continued)

*Primary Examiner* — Bobby Rushing, Jr.
(74) *Attorney, Agent, or Firm* — Studebaker Brackett PLLC

(57) ABSTRACT

In a shift device, a P position, an R position, an N position, and a D position are set on a housing, and when an electrostatic sheet detects a touch operation on the P position, the R position, the N position, or the D position and a photosensor detects a pressing operation on the housing, a shift range of a transmission is changed. Therefore, the number of components can be reduced.

5 Claims, 3 Drawing Sheets

(56)            References Cited

U.S. PATENT DOCUMENTS

| | | | |
|---|---|---|---|
| 10,408,337 B2 * | 9/2019 | Kim | F16H 59/08 |
| 10,801,610 B2 * | 10/2020 | Cha | B60K 35/265 |
| 10,818,260 B2 * | 10/2020 | Tagawa | G06F 3/0416 |
| 10,871,862 B2 * | 12/2020 | Cao | G06F 3/044 |
| 10,902,813 B2 * | 1/2021 | Takeuchi | G06F 3/04166 |
| 11,267,442 B2 * | 3/2022 | Takada | H04L 63/0861 |
| 11,797,088 B2 * | 10/2023 | Eraslan | G06F 3/0416 |
| 2013/0097553 A1 * | 4/2013 | Suzuki | G06F 3/04842 |
| | | | 715/781 |
| 2017/0308167 A1 | 10/2017 | Shibuya | |
| 2018/0164903 A1 * | 6/2018 | Chu | G06F 3/0362 |

FOREIGN PATENT DOCUMENTS

| | | | | |
|---|---|---|---|---|
| JP | S62-107321 U | | 7/1987 | |
| JP | 2006177401 A | * | 7/2006 | G06F 3/0488 |
| JP | 2006-236694 A | | 9/2006 | |
| JP | 2012-216113 A | | 11/2012 | |
| JP | 2013-159270 A | | 8/2013 | |
| JP | 2017-194886 A | | 10/2017 | |
| JP | 2021-062701 A | | 4/2021 | |
| KR | 101500107 B1 | * | 3/2015 | |
| KR | 20220037751 A | * | 3/2022 | F16H 61/16 |

OTHER PUBLICATIONS

"Notice of Reasons for Refusal" Office Action issued in JP 2022-070383; mailed by the Japanese Patent Office on Jan. 14, 2025; with partial English translation.

* cited by examiner

SHIFT DEVICE

TECHNICAL FIELD

The present disclosure relates to a shift device in which an operation body is operable.

BACKGROUND ART

In a shift operation switch device described in Japanese Patent Application Laid-Open No. 2012-216113, a plurality of push buttons are provided in a switch unit, and the push buttons are pushed to change a range of a vehicle.

Here, in such a shift operation switch device, the push button is provided for each range of the vehicle, and a spring corresponding to the push operation is provided for each push button.

SUMMARY OF INVENTION

Technical Problem

The present disclosure has been made in view of the above circumstance, and an object of the disclosure is to obtain a shift device capable of reducing the number of components.

Solution to Problem

According to a first aspect of the present disclosure, a shift device includes: an operation body on which a plurality of shift positions are set; and a detection portion that detects a touch operation on the shift position and a pressing operation on the operation body to change a shift range of a transmission of a vehicle.

According to a second aspect of the disclosure, in the shift device according to the first aspect of the disclosure, the plurality of shift positions are set on the same surface of the operation body.

According to a third aspect of the disclosure, in the shift device according to the first or second aspect of the disclosure, the detection portion detects the touch operation on the shift position and then detects the pressing operation on the operation body to change the shift range.

According to a fourth aspect of the disclosure, the shift device according to any one of the first to third aspects of the disclosure further includes a restriction mechanism that restricts the pressing operation on the operation body at a predetermined opportunity.

Advantageous Effects of Invention

In the shift device according to the first aspect of the disclosure, the plurality of shift positions are set on the operation body, and the detection portion detects the touch operation on the shift position and the pressing operation on the operation body to change the shift range of the transmission of the vehicle. Therefore, the number of operation bodies can be reduced, and since it is sufficient if a component corresponding to the pressing operation on the operation body is provided, the number of components can be reduced.

In the shift device according to the second aspect of the disclosure, the plurality of shift positions are set on the same surface of the operation body. Therefore, a touch operation can be easily performed on the plurality of shift positions.

In the shift device according to the third aspect of the disclosure, the detection portion detects the touch operation on the shift position and then detects the pressing operation on the operation body to change the shift range. Therefore, the operation on the operation body can be easily performed.

In the shift device according to the fourth aspect of the disclosure, the restriction mechanism restricts the pressing operation on the operation body at a predetermined opportunity. Therefore, the change of the shift range can be restricted.

DESCRIPTION OF EMBODIMENTS

Figure 1:
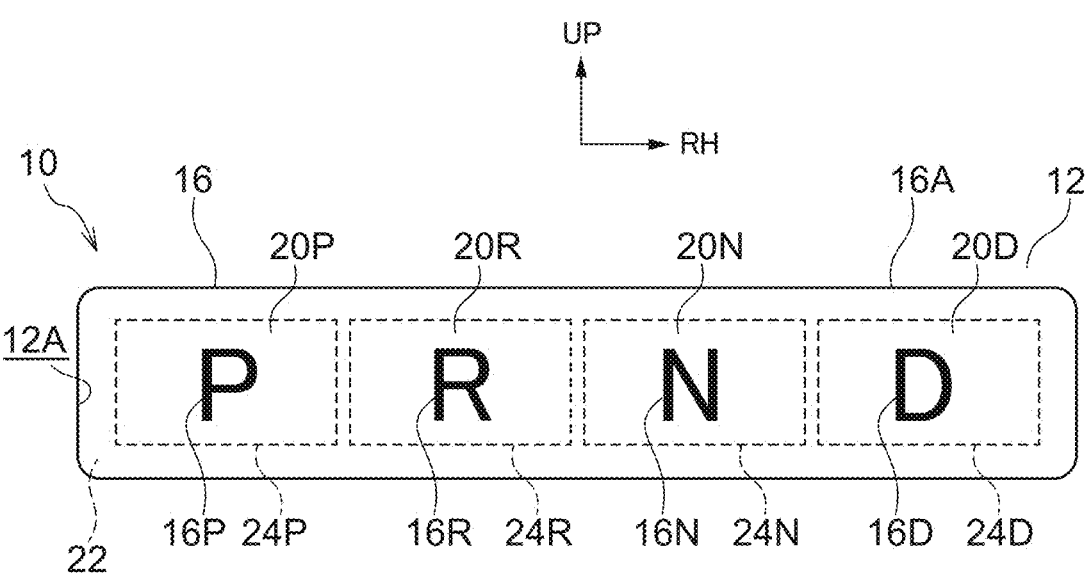
FIG. 1 is a front view showing a shift device according to an embodiment of the present disclosure when viewed from the front.
Figure 2:
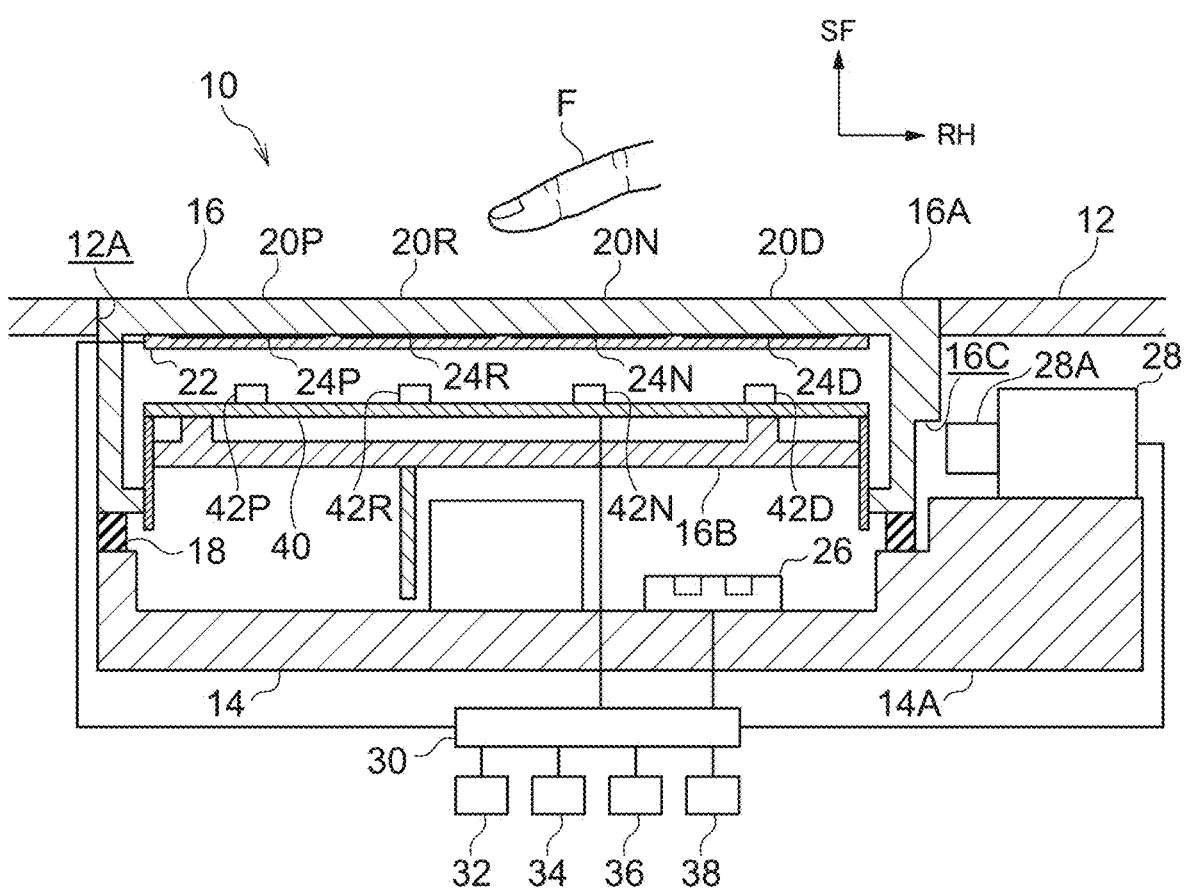
FIG. 2 is a cross-sectional view showing the shift device according to the embodiment of the disclosure when viewed from below.

FIG. 1 is a front view of a shift device 10 according to an embodiment of the present disclosure when viewed from the front, and FIG. 2 is a cross-sectional view of the shift device 10 when viewed from below. In the drawings, a front side of the shift device 10 is indicated by an arrow SF, a right side of the shift device 10 is indicated by an arrow RH, and an upper side of the shift device 10 is indicated by an arrow UP.

As illustrated in FIGS. 1 and 2, the shift device 10 according to the present embodiment is installed at the center of an instrument panel 12 of a vehicle (automobile) in a vehicle width direction, and is disposed inside a steering wheel (not illustrated) of the vehicle in the vehicle width direction. The front side, the right side, and the upper side of the shift device 10 are directed to a rear side, a right side, and an upper side of the vehicle, respectively.

The shift device 10 includes a case 14 having a substantially rectangular parallelepiped box shape as an installation body, and the case 14 is fixed to a vehicle front side of the instrument panel 12. The case 14 is elongated in a left-right direction, and the inside of the case 14 is opened to a front side. In the instrument panel 12, a rectangular opening 12A is formed on a vehicle rear side of the case 14, and the case 14 faces the opening 12A. A fixed column 14A having a substantially rectangular parallelepiped shape is integrally provided on a right wall of the case 14, and the fixed column 14A protrudes rightward and forward from the right wall of the case 14.

A substantially rectangular parallelepiped box-shaped housing 16 as an operation body is provided on the front side of the case 14, and the housing 16 is elongated in the left-right direction and made of, for example, a resin to be an insulator. A front housing 16A having a substantially rectangular parallelepiped box shape is provided in a front side portion of the housing 16, and a portion other than an outer peripheral portion of a back wall of the front housing 16A is opened. A back housing 16B having a substantially rectangular plate shape is provided in a back side portion of the housing 16, and the back housing 16B is connected to an outer peripheral portion of the back wall of the front housing 16A. The back housing 16B is disposed in the front housing 16A, and the back housing 16B is disposed parallel to a front wall of the front housing 16A. On a right surface of the housing 16, a restricted groove 16C as a restricted portion is formed at a back side portion, and the restricted groove 16C is opened to the right side and the back side.

A rectangular frame-shaped rubber 18 as a biasing member is provided between a side wall of the case 14 and the outer peripheral portion of the back wall of the housing 16, and the rubber 18 connects the case 14 and the housing 16. The rubber 18 is elastically contractible, and the housing 16 is displaceable backward against an elastic force (biasing force) of the rubber 18.

A front wall of the housing 16 is fitted to the opening 12A of the instrument panel 12, and the flat front side surface of the housing 16 forms a design surface of a vehicle interior of the vehicle together with a vehicle rear side surface of the instrument panel 12. Therefore, the front side surface of the housing 16 can be touched and pressed by a finger F of an occupant (particularly a driver) of the vehicle.

A rectangular P position 20P (park position), an R position 20R (reverse position), an N position 20N (neutral position), and a D position 20D (drive position) as shift positions are set on the front side surface of the housing 16, and the P position 20P, the R position 20R, the N position 20N, and the D position 20D are arranged at equal intervals in this order from the left to the right. In addition, a "P" indicator 16P, an "R" indicator 16R, an "N" indicator 16N, and a "D" indicator 16D are displayed at central portions of the P position 20P, the R position 20R, the N position 20N, and the D position 20D, respectively.

A rectangular sheet-shaped electrostatic sheet 22 as a touch detection portion that forms a detection portion is fixed to a back side of the front wall of the housing 16, and the electrostatic sheet 22 covers a back side surface of the front wall of the housing 16. A P electrode 24P, an R electrode 24R, an N electrode 24N, and a D electrode 24D each having a rectangular film shape as shift detection portions are provided on a front side of the electrostatic sheet 22, and the P electrode 24P, the R electrode 24R, the N electrode 24N, and the D electrode 24D are arranged at equal intervals in this order from the left to the right. The entirety of each of the P electrode 24P, the R electrode 24R, the N electrode 24N, and the D electrode 24D faces the entirety of each of the P position 20P, the R position 20R, the N position 20N, and the D position 20D in a front-back direction (a thickness direction of the front wall of the housing 16), and the P electrode 24P, the R electrode 24R, the N electrode 24N, and the D electrode 24D are made of, for example, metal and have conductivity.

The front wall (including the electrostatic sheet 22) of the housing 16 can transmit light at portions of the "P" indicator 16P, the "R" indicator 16R, the "N" indicator 16N, and the "D" indicator 16D.

A circuit board 40 is provided in the housing 16, and the circuit board 40 is fixed to a front side of the back housing 16B. A P element 42P, an R element 42R, an N element 42N, and a D element 42D as illumination units are fixed to a front side surface of the circuit board 40, and the P element 42P, the R element 42R, the N element 42N, and the D element 42D are light emitting diodes (LEDs), and face the portions of the "P" indicator 16P, the "R" indicator 16R, the "N" indicator 16N, and the "D" indicator 16D on the front wall of the housing 16 in the front-back direction, respectively.

A photosensor 26 as a pressing detection portion that forms a detection portion is fixed in the case 14, and the photosensor 26 faces the back housing 16B of the housing 16. The photosensor 26 can irradiate the back housing 16B with light and can receive light reflected by the back housing

16B, and the photosensor 26 can detect a distance to the housing 16 and detect a backward displacement distance of the housing 16.

A solenoid 28 as a restriction mechanism is fixed to a front side of the fixed column 14A of the case 14. The solenoid 28 includes a columnar plunger 28A as a restricting portion, and the plunger 28A faces the restricted groove 16C of the housing 16 on the left side. When the solenoid 28 is actuated, the plunger 28A extends leftward from the solenoid 28 and is inserted into the restricted groove 16C, so that the plunger 28A restricts backward displacement of a front side surface of the restricted groove 16C, thereby restricting the backward displacement of the housing 16.

The P electrode 24P, the R electrode 24R, the N electrode 24N, and the D electrode 24D of the electrostatic sheet 22, the P element 42P, the R element 42R, the N element 42N, and the D element 42D of the circuit board 40, the photosensor 26, and the solenoid 28 are electrically connected to the control device 30 of the vehicle. The control device 30 is provided with a microcomputer in which a central processing unit (CPU), a read only memory (ROM), a random access memory (RAM), a non-volatile memory (storage), and the like are connected by a bus. In the control device 30, the CPU reads a program stored in the ROM and the storage and executes the program while loading the program in the RAM, thereby implementing various functions. In addition, a transmission 32 (automatic transmission) and a brake 34 (foot brake) of the vehicle, a speedometer 36 of the vehicle, and an N switch 38 (neutral lock switch) are electrically connected to the control device 30.

Next, actions according to the embodiment will be described.

In the shift device 10 having the above configuration, when the occupant performs a touch operation on the P position 20P, the R position 20R, the N position 20N, or the D position 20D on the front side surface of the housing 16 with the finger F, an electrostatic capacitance is generated between the finger F and the P electrode 24P, the R electrode 24R, the N electrode 24N, or the D electrode 24D of the electrostatic sheet 22. Further, when the occupant presses the front side surface of the housing 16 with the finger F, the housing 16 is displaced backward against the biasing force of the rubber 18. When the capacitance between the finger F and the P electrode 24P, the R electrode 24R, the N electrode 24N, or the D electrode 24D is equal to or larger than a capacitance threshold, and the backward displacement distance of the housing 16 is equal to or larger than a distance threshold (the backward displacement distance of the housing 16 detected by the photosensor 26 is equal to or larger than the distance threshold), the control device 30 determines that the P position 20P, the R position 20R, the N position 20N, or the D position 20D is selected, and a shift range of the transmission 32 is changed to a corresponding P range (park range), R range (reverse range), N range (neutral range), or D range (drive range) under the control of the control device 30.

When the shift range of the transmission 32 is changed to the P range, the R range, the N range, or the D range, the P element 42P, the R element 42R, the N element 42N, or the D element 42D of the circuit board 40 emits light under the control of the control device 30, such that the "P" indicator 16P, the "R" indicator 16R, the "N" indicator 16N, or the "D" indicator 16D on the front side surface of the housing 16 is illuminated.

In a case where the brake 34 is not operated (turned off) when the transmission 32 is in the P range (predetermined opportunity), the solenoid 28 is operated under the control of the control device 30, and the plunger 28A of the solenoid 28 is inserted into the restricted groove 16C of the housing 16, whereby the backward displacement of the housing 16 is restricted. Therefore, the change of the shift range of the transmission 32 is restricted.

On the other hand, in a case where the brake 34 is operated (turned on) when the transmission 32 is in the P range, the operation of the solenoid 28 is deactivated under the control of the control device 30, and the plunger 28A is separated from the restricted groove 16C, so that the backward displacement of the housing 16 is permitted. Therefore, the change of the shift range of the transmission 32 is permitted.

In a case where a forward speed or backward speed of the vehicle is equal to or higher than a predetermined speed (a forward speed or backward speed of the vehicle measured by the speedometer 36 is equal to or higher than a predetermined speed) when the transmission 32 is in the D range or the R range (predetermined opportunity), the solenoid 28 is operated under the control of the control device 30 to restrict the backward displacement of the housing 16. Therefore, the change of the shift range of the transmission 32 is restricted.

In a case where the forward speed or backward speed of the vehicle is lower than the predetermined speed (the forward speed or backward speed of the vehicle measured by the speedometer 36 is lower than the predetermined speed) when the transmission 32 is in the D range or the R range (predetermined opportunity), the operation of the solenoid 28 is deactivated under the control of the control device 30 to permit the backward displacement of the housing 16. Therefore, the change of the shift range of the transmission 32 is permitted.

In a case where the N switch 38 is turned on when the transmission 32 is in the N range (predetermined opportunity), the solenoid 28 is operated under the control of the control device 30, and the backward displacement of the housing 16 is restricted. Therefore, the change of the shift range of the transmission 32 is restricted.

On the other hand, in a case where the N switch 38 is turned off when the transmission 32 is in the N range, the operation of the solenoid 28 is deactivated under the control of the control device 30, and the backward displacement of the housing 16 is permitted. Therefore, the change of the shift range of the transmission 32 is permitted.

In a case where one or more fingers F of the occupant touch two or more of the P position 20P, the R position 20R, the N position 20N, and the D position 20D, and an electrostatic capacitance between the one or more fingers F and the two or more of the P electrode 24P, the R electrode 24R, the N electrode 24N, and the D electrode 24D is equal to or larger than a capacitance threshold (predetermined opportunity), the solenoid 28 is operated under the control of the control device 30, and the backward displacement of the housing 16 is restricted. Therefore, the change of the shift range of the transmission 32 is restricted.

On the other hand, in a case where a state in which one or more fingers F of the occupant touch two or more of the P position 20P, the R position 20R, the N position 20N, and the D position 20D is released and a state in which the electrostatic capacitance between the one or more fingers F and the two or more of the P electrode 24P, the R electrode 24R, the N electrode 24N, and the D electrode 24D is equal to or larger than the capacitance threshold is released, the operation of the solenoid 28 is deactivated under the control of the control device 30 and the backward displacement of the housing 16 is permitted. Therefore, the change of the shift range of the transmission 32 is permitted.

Here, the P position 20P, the R position 20R, the N position 20N, and the D position 20D are set on the housing 16, and the P electrode 24P, the R electrode 24R, the N electrode 24N, and the D electrode 24D detect touch operations on the P position 20P, the R position 20R, the N position 20N, and the D position 20D, respectively, and the photosensor 26 detects a pressing operation on the housing 16, whereby the shift range of the transmission 32 is changed. Therefore, the number of housings 16 can one, and a component (rubber 18) corresponding to the pressing operation may be provided on the housing 16, so that the number of components can be reduced and the cost can be reduced. In addition, since one housing 16 (operation body) is provided, the appearance of the shift device 10 can be improved.

Further, after the P electrode 24P, the R electrode 24R, the N electrode 24N, and the D electrode 24D detect touch operations on the P position 20P, the R position 20R, the N position 20N, and the D position 20D, respectively, the photosensor 26 detects the pressing operation on the housing 16, whereby the shift range of the transmission 32 is changed. Therefore, it is possible to easily operate the housing 16 with the finger F of the occupant.

Moreover, the P position 20P, the R position 20R, the N position 20N, and the D position 20D are set on the front side surface (the same surface) of the housing 16. Therefore, for example, the occupant can perform the touch operation on the P position 20P, the R position 20R, the N position 20N, and the D position 20D by tracing the front side surface of the housing 16 with the finger F, and can easily perform the touch operation on the P position 20P, the R position 20R, the N position 20N, and the D position 20D.

In addition, the solenoid 28 is operated to restrict the backward displacement of the housing 16. Therefore, the shift range of the transmission 32 can be restricted from being unnecessarily changed, and the occupant can clearly recognize that the change of the shift range of the transmission 32 is restricted.

Modification

Figure 3:
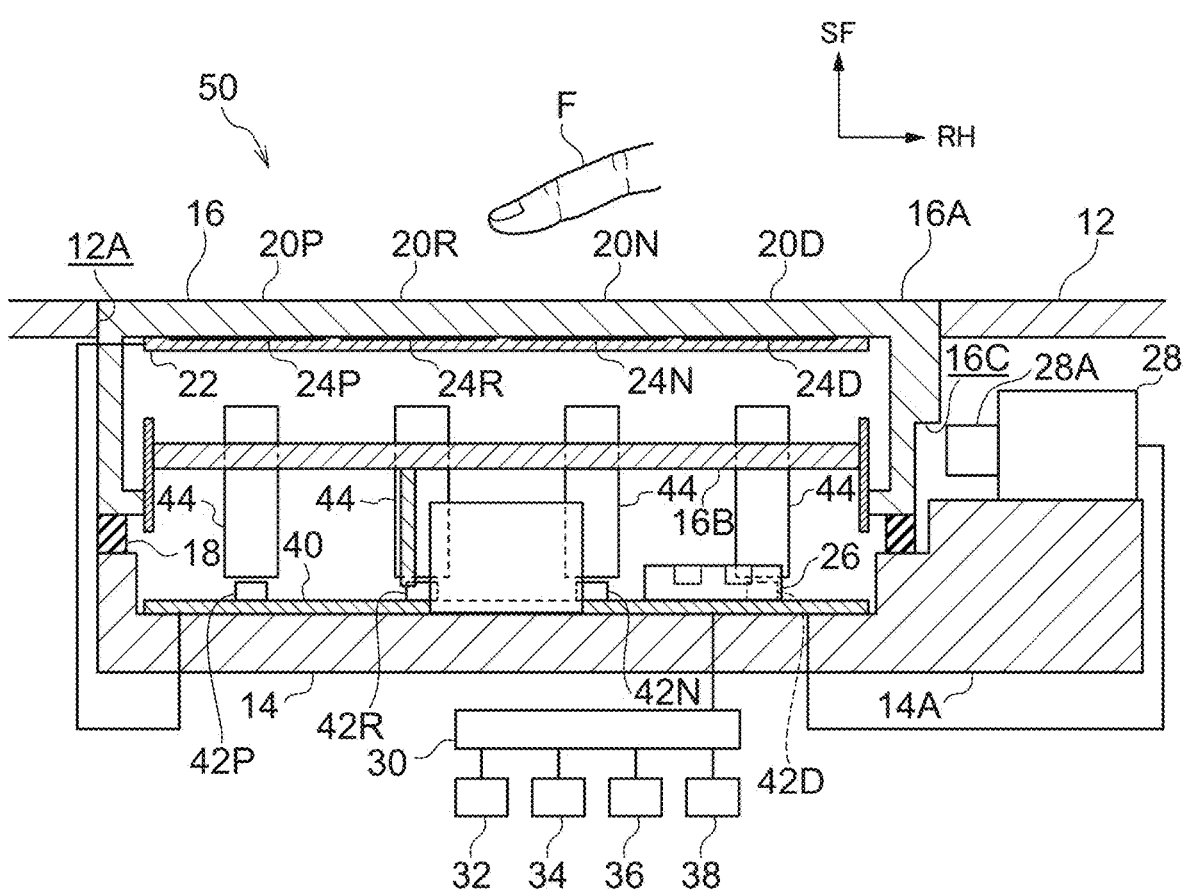
FIG. 3 is a cross-sectional view of a shift device according to a modification of the embodiment of the disclosure when viewed from below.

FIG. 3 is a cross-sectional view of a shift device 50 according to a modification of the embodiment when viewed from below.

As illustrated in FIG. 3, in the shift device 50 according to the present modification, a circuit board 40 is fixed to a back side surface in a case 14, and a photosensor 26 is fixed to a front side surface of the circuit board 40.

Columnar light guides 44 as guide members are provided between a P element 42P, an R element 42R, an N element 42N, and a D element 42D of the circuit board 40 and portions of a "P" indicator 16P, an "R" indicator 16R, an "N" indicator 16N, and a "D" indicator 16D on a front wall of a housing 16, and the light guides 44 penetrate through and are fixed to a back housing 16B of the housing 16. The light guides 44 are arranged parallel to a front-back direction, and the light guides 44 are made transparent to guide light.

A P electrode 24P, an R electrode 24R, an N electrode 24N, and a D electrode 24D of an electrostatic sheet 22, the P element 42P, the R element 42R, the N element 42N, and the D element 42D of the circuit board 40, a photosensor 26, and a solenoid 28 are electrically connected to a control device 30 via the circuit board 40.

When a shift range of a transmission 32 is changed to a P range, an R range, an N range, or a D range, the P element 42P, the R element 42R, the N element 42N, or the D element 42D of the circuit board 40 emits light under the control of the control device 30, such that the light guide 44 guides the light to illuminate the "P" indicator 16P, the "R" indicator 16R, the "N" indicator 16N, or the "D" indicator 16D on a front side surface of the housing 16.

In the embodiment (including the modification), the front side surface of the housing 16 is flat. However, the front side surface of the housing 16 may be a curved surface.

In the embodiment (including the modification), the restriction mechanism is the solenoid 28, and when the solenoid 28 is operated, the plunger 28A of the solenoid 28 is inserted into the restricted groove 16C of the housing 16, so that the plunger 28A restricts the backward displacement of the front side surface of the restricted groove 16C, thereby restricting the backward displacement of the housing 16. However, the restriction mechanism may include a motor and a restriction member, and the motor and the restriction member may be connected by, for example, a rack and pinion mechanism. When the motor is operated and the restriction member is inserted into the restricted groove 16C of the housing 16, the restriction member may restrict the backward displacement of the front side surface of the restricted groove 16C, so that the backward displacement of the housing 16 may be restricted.

Furthermore, in the embodiment (including the modification), the photosensor 26 (pressing detection portion) detects the backward displacement distance of the housing 16 by light. However, the pressing detection portion may magnetically detect the backward displacement distance of the housing 16, and the pressing detection portion may detect the backward displacement distance of the housing 16 with a switch.

In the embodiment (including the modification), the shift devices 10 and 50 are installed on an instrument panel. However, the shift devices 10 and 50 may be installed on other parts of the vehicle (such as a console or a column cover).

The disclosure of Japanese Patent Application No. 2022-070383 filed on Apr. 21, 2022 is incorporated herein by reference in its entirety.

All documents, patent applications, and technical standards mentioned herein are incorporated herein by reference to the same extent as if each individual document, patent application, and technical standard were specifically and individually stated.

The invention claimed is:

1. A shift device comprising:
a single operation body on which a plurality of shift positions are set on a front side surface, the operation body being configured to be displaceable toward a back side when pressed; and
a detection portion including a plurality of touch sensors arranged respectively corresponding to the plurality of shift positions and configured to detect a touch operation on the shift position, and a pressing sensor configured to detect a pressing operation on the operation body by detecting a displacement distance of the entire operation body toward the back side due to the pressing operation on the operation body,
wherein the detection portion is configured to detect, by one of the touch sensors, a touch operation on a specific shift position among the plurality of shift positions to select the specific shift position, and
wherein the detection portion is configured to detect, by the pressing sensor, after the specific shift position has been selected, that a pressing operation has been performed on the operation body and to change a shift range of a transmission of a vehicle to a specific shift range.

2. The shift device according to claim 1, further comprising a restriction mechanism, the restriction mechanism being configured to restrict the pressing operation on the operation body at a predetermined opportunity by restricting displacement of the operation body toward the back side.

3. The shift device according to claim 2, wherein:
a restricted groove is formed at the operation body, and
the restriction mechanism includes a restricting portion, the restricting portion being configured to restrict the displacement of the operation body toward the back side by being inserted into the restricted groove.

4. The shift device according to claim 1, further comprising a biasing member, the biasing member being elastically contractible and connected to the operation body,
wherein the operation body is configured to be displaced toward the back side against a biasing force of the biasing member when pressed.

5. The shift device according to claim 1, wherein a shift device operator can tactilely perceive whether or not the operation body has been displaced in response to the pressing operation.

* * * * *